Sept. 24, 1968   A. M. WAGNER   3,402,491
PORTABLE VISUAL DISPLAY DEVICE
Original Filed July 1, 1965   3 Sheets-Sheet 1

INVENTOR.
ARTHUR M. WAGNER
BY Amster & Rothstein
ATTORNEYS

Sept. 24, 1968  A. M. WAGNER  3,402,491

PORTABLE VISUAL DISPLAY DEVICE

Original Filed July 1, 1965  3 Sheets-Sheet 2

INVENTOR.
ARTHUR M. WAGNER
BY
Amster & Rothstein
ATTORNEYS

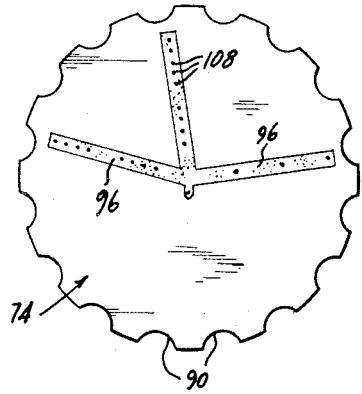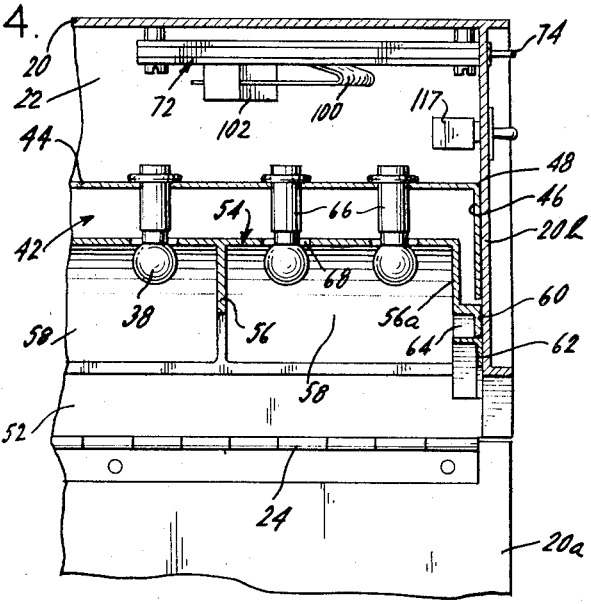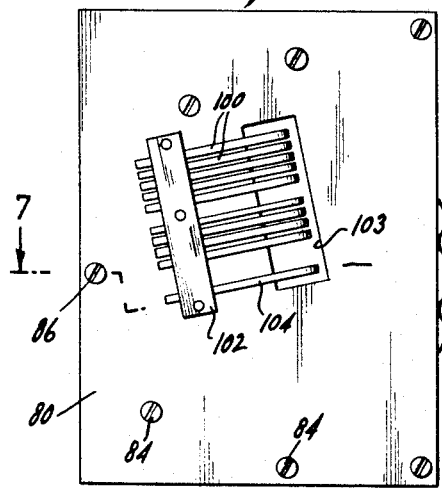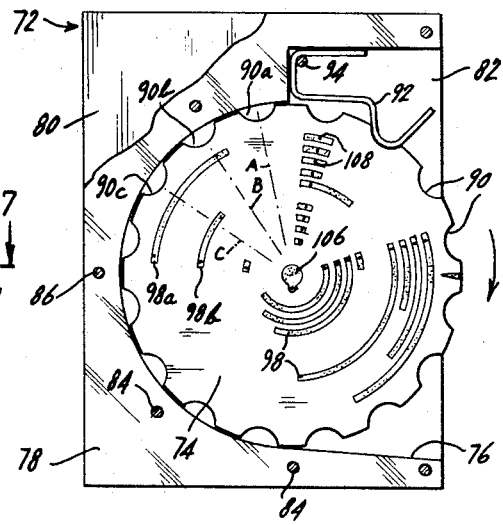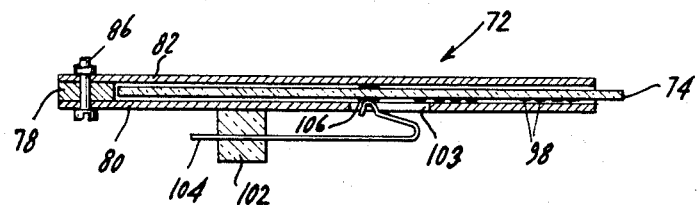

United States Patent Office 3,402,491
Patented Sept. 24, 1968

3,402,491
PORTABLE VISUAL DISPLAY DEVICE
Arthur M. Wagner, New York, N.Y., assignor to Xicom Inc., Tuxedo, N.Y., a corporation of Delaware
Continuation of application Ser. No. 468,881, July 1, 1965.
This application Feb. 9, 1968, Ser. No. 704,491
3 Claims. (Cl. 40—106.1)

ABSTRACT OF THE DISCLOSURE

The type of portable visual display device having plural lights to selectively illuminate slides or the like but with an improved, easily replaceable rotary switch controlling the sequence of energizing the lights. The switch, for ease of replacement, is held in rotating position by a spring rather than being mounted on a supporting shaft from which it would have to be connected and disconnected. Each switch gives a different lighting sequence and thus, by proper switch selection, any desired lighting sequence is possible.

---

This application is a continuation of application Ser. No. 468,881, filed July 1, 1965, now abandoned.

The present invention relates generally to visual display devices, and more particularly to certain improvements for such devices which are conveniently portable and are intended primarily for use as a selling and demonstration aid.

The use during selling or other demonstrations of visual aids in conjuction with written or orally conveyed material is already a well established and highly desirable practice. There are also many devices already in use for projecting or otherwise making materials available for viewing during such demonstrations. These currently available devices, however, are not entirely satisfactory. The majority of such devices are not portable, and accordingly it is necessary to make advance arrangements and preparations to transport the audience to the place of the demonstration. The few available visual display devices which are portable have such a small display area, and required such frequent loading and unloading of slides or the like that they are not convenient to use, nor are they for this reason consistent with necessary circumstances for making a forceful and effective demonstration. Still other currently known devices are not sufficiently versatile so that departures can be made, if necessary, from the contemplated sequence of displaying the visual materials.

Broadly, it is an object of the present invention to overcome the foregoing and other shortcomings of the prior art. Specifically, it is an object of the present invention to provide a visual display device which in weight and size is consistent with portability, and which nevertheless has an ample display area and also functions in a manner conducive to making a forceful demonstration.

A further object of the present invention is to provide a portable visual display device capable of displaying materials or indicia in accordance with a programed sequence which, however, may be varied if necessary. Moreover, said portable device accommodates a relatively large composite slide containing said materials or indicia to be displayed, and thus for the usual demonstration may be loaded or set-up prior to such demonstration. The elimination of the need to load and unload the device during a demonstration eliminates perhaps the most distracting and undesirable feature of currently known prior art devices.

A portable visual display device demonstrating features of the present invention includes a carrying case having lights, electrical components and circuitry for illuminating said lights, suitably housed within the enclosed area of said carrying case. The carrying case also has a main opening in one side thereof in which a display panel is mounted having indicia thereon which is rendered visible by illumination. The arrangement of the lights within the carrying case is such that the illumination therefrom is confined to select areas on said display panel and the functioning of switching means associated with the electrical circuitry is such as to selectively energize these lights. In this manner, the indicia on said select areas is rendered visible in accordance with a programed sequence characteristic of said switching means with the result that at an appropriate point in time during the oral presentation of materials said indicia is made available to aid the demonstration. The present display device also is provided with auxiliary switching means for both by-passing the energizing of certain of the lights in said programed sequence and also for energizing additional lights to supplement said programmed sequence, with the result that variations from the prearranged program are easily provided.

In a preferred form, the main switching means for the present visual display device includes a member of a circular shape. This member is mounted for rotation within the enclosed area of the carrying case and has a peripheral portion accessible to the exterior of said case for turning said member through various positions of rotation. Said rotating member is provided with contact means for establishing an electrical connection between the power source and select lights in each position of rotation. Thus, with a minimum number of such members having different arrangements of contact means thereon, it is possible to achieve a wide variety of sequential energizing of such lights, thereby affording a wide range of possibilities as to how the various select areas on said display panel can be displayed. Additionally, it is contemplated that several display panels, each having different materials and indicia thereon, will be available for demonstration purposes and capable of interchangeable use in said device, to even further increase the versatility of said device as a selling and demonstration aid.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 4 is a partial plan view, in section taken on line

Figure 9:
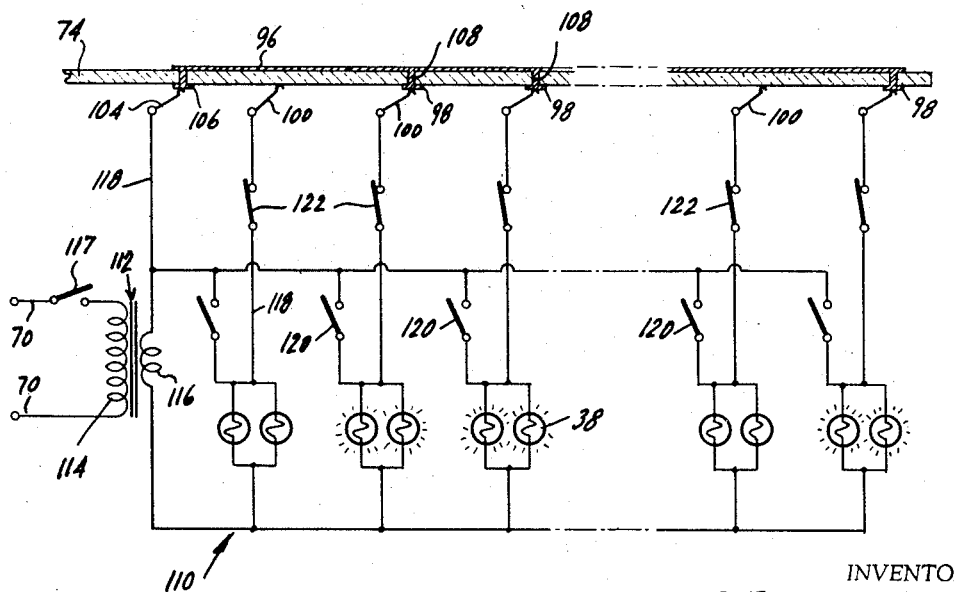
Figure 3:
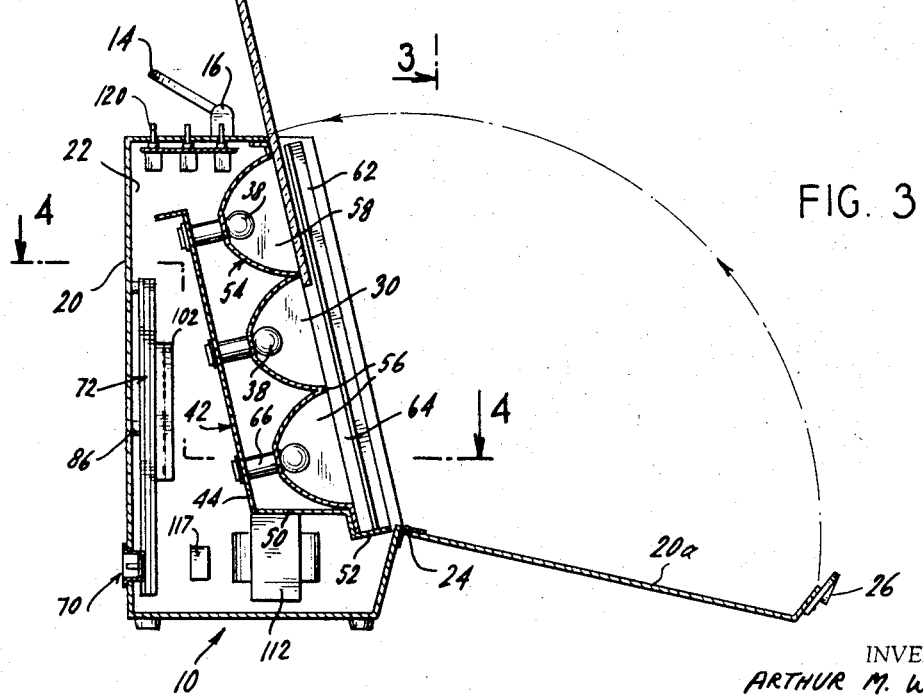
FIG. 3 is a side elevational view, in section taken on line 3—3 of FIG. 2, illustrating details of the structure housed within an enclosure of the carrying case of said device.

4—4 of FIG. 3, illustrating further details of said structure within the carrying case enclosure;

FIG. 5 is an isolated elevational view, on an enlarged scale, of a rotating switching member of said device;

FIG. 6 is an elevational view similar to FIG. 5, but with portions broken away to better illustrate further structural details;

FIG. 7 is a plan view, in section taken on line 7—7 of FIG. 5, best illustrating the freely rotatable operative position of the rotating switching member within its mounting;

FIG. 8 is an isolated elevational view of said rotating member turned to expose a face thereof not visible in FIG. 6; and FIG. 9 is a schematic diagram of the electrical circuitry for said device, in which said rotating switching member is illustrated in cross section.

Figure 1:
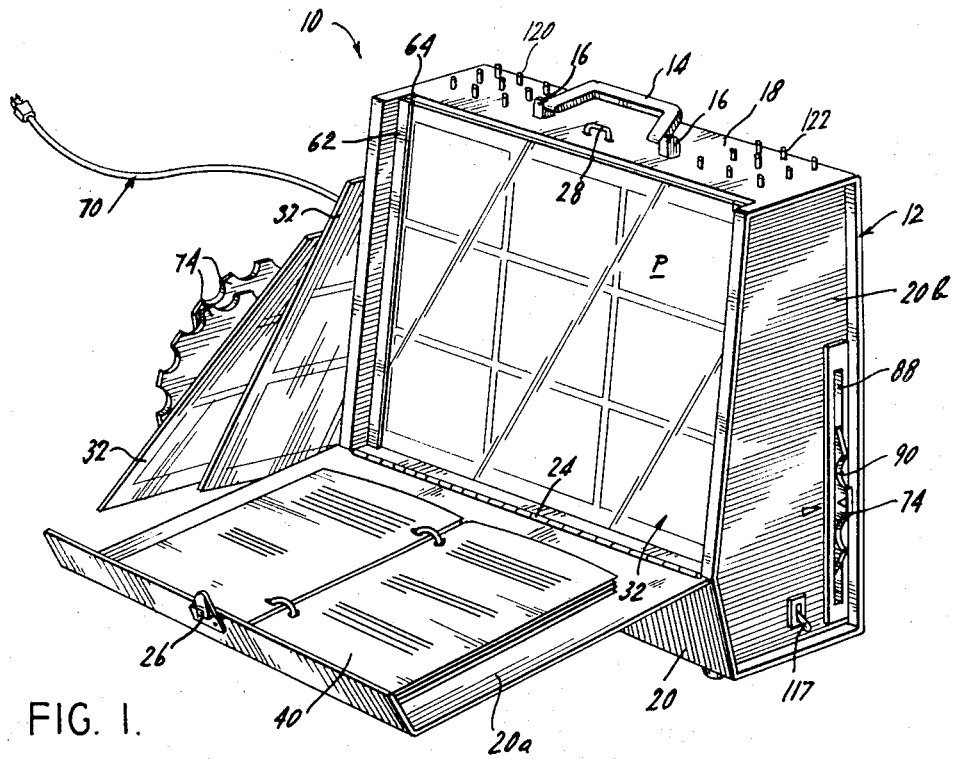
FIG. 1 is a perspective view of a portable visual display device demonstrating features of the present invention.
Figure 2:
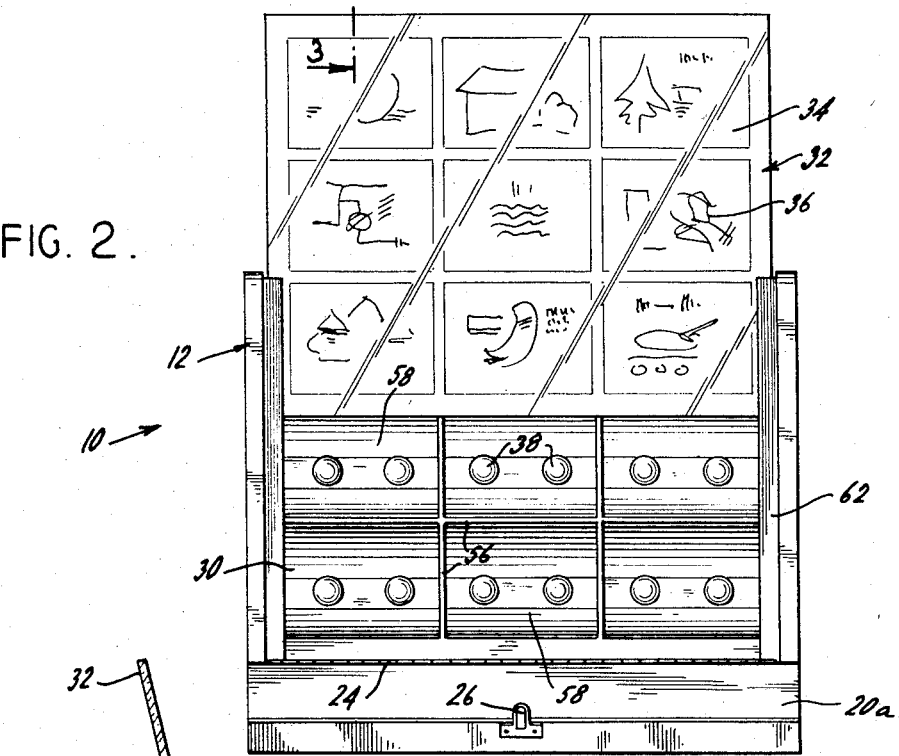
FIG. 2 is a front elevational view of said device with the display panel thereof partially lifted from its operative position in said device.

Having reference now to the drawings, there is shown in FIGS. 1–3 a portable visual display device, generally designated 10, demonstrating features of the present invention. The device 10, consistent with its primary end-use as a versatile visual aid for salesmen, is constructed for portability by including a carrying case, generally designated 12, provided with a convenient hand grip 14 secured in a conventional manner, as at 16, to an upper panel 18 of said carrying case 12. The additional carrying case panels, herein individually and collectively designated 20, define an interior enclosed area 22, in which as best shown in FIGS. 2, 3, all of the functioning parts of the device 10 are conveniently housed. A front panel of said carrying case 12, herein specifically designated 20a, serves as a cover for the case and is hinged thereto along one edge, as at 24, and has a conventional luggage locking member 26 at its other edge for releasibly engaging with a cooperating locking member 28 on the upper panel 18. The case cover 20a serves as a closure for a main opening 30 in one side of the carrying case 12.

Appropriately mounted in said main opening 30 is a display panel, generally designated 32, which will be understood in the embodiment described herein to have nine slides, individually and collectively designated 34, appropriately protected by being sandwiched between transparent plastic sheets P. As illustrated, an acceptable arrangement of said slides 34 may consist of three horizontal and vertical rows. The slides 34 of the panel 32 are of the usual type in which the detail or indicia thereon, herein generally designated 36 (see FIG. 2), is rendered visible (at least for all practical purposes) only when the slides 34 are illuminated.

The display device 10 employs one of several display panels 32, each having such slides 34, by having the same operatively mounted in the main opening 30. Moreover, conveniently housed in the carrying case enclosed area 22 behind the display panel 32 is structure including a plurality of lights 38 for selectively illuminating said slides 34. This selective illumination is achieved by switching means which is effective to connect a power source to only those of such lights 38 asociated with the slides 34 that it is desired to illuminate. In other words, in the functioning of the display device 10 it is possible for the user or salesman to program the sequence in time at which one or more of specifically located lights 38 are energized to thereby have those specific slides 34 associated with said lights rendered visible in accordance with said programed sequence. For example, such programming might occur in accordance with a script being read by the salesman and conveniently accessible, as at 40, on the back of the carrying case cover 20a.

Turning now to the details in the construction of the display device 10, as best shown in FIGS. 1–4, there is mounted in the carrying case opening 30 an appropriate light-mounting structure, generally designated 42. Said structure includes a slightly inclined light-mounting panel 44 having opposite side mounting walls 46 bent transversely, as at the corners 48, for presenting a convenient surface for making an attachment to the interior surfaces of the case 12. A lower forwardly bent section 50 of the panel 44 terminates in a lip 52 which extends practically to the hinge 24 and thus is in an advantageous position to support the display panel 32 in its operative position in the main opening 30.

Still referring to FIGS. 1–4, and in particular to FIG. 4, it will be noted that there is also provided in said main opening 30 and in a spaced position forward of the light-mounting panel 44 a light-reflecting structure 54 having plural intersecting walls, herein individually and collectively designated 56, which define therebetween a plurality of self-contained chambers 58 of a size generally coextensive with the size of each of the slides 34 of the display panel 32. Two lights 38 are allotted to each of the chambers 58 and the illumination produced from such lights are confined by said walls 56 to only that slide 34 which is positioned immediately in front of said chamber 58. As best shown in FIG. 4, the end side walls of the reflecting structure 54, more specifically designated 56a, terminate in a configuration 60 which together with a bracket 62 attached to the carrying case side panels, more specifically designated 20b, form an inclined track 64 along the opposite sides of the main opening 30. These tracks 64 conveniently and interchangeably slidably receive any one of the several available display panels 32 (see F G. 1) preparatory to a demonstration, and also facilitate the ready removal and loading of a series of panels 32 for the exceptional lengthy demonstration. However, even in such a case the loading operation is quick and easy to perform so that distraction is reduced to a minimum.

As best shown in FIGS. 3, 4, conventional sockets, herein individually and collectively designated 66, are appropriately mounted between the light-mounting panel 44 and the reflecting structure 54. In this connection, the base of each socket 66 is secured in an appropriate and conventiional manner to the panel 44 with the opening into each socket 66 aligning with an opening 68 in said reflecting structure 54 and threadably receiving therein a bulb 38. In practice, it is contemplated that the device 10 will be positioned near an electrical wall outlet and that a conventional electric cord and plug 70 of said device will be plugged into said wall outlet to power the display device 10. More particularly, the electrical power fed into the display device 10 to ultimately illuminate the lights 38 is transmitted through appropriate circuitry including a rotary switching mechanism, herein generally designated 72, in a manner to selectively energize the lights 38 in accordance with a prearranged program or sequence most conducive to provide an effective and forceful demonstration.

As best seen in FIGS. 4–9, the switching mechanism 72 includes a rotating member 74 of a circular shape which is mounted for rotation within an assembly of panel members 78, 80 and 82; the member 78 being in the middle and having a curved track 76 to accommodate the switching member 74. The assembly of the panels 78, 80, 82 to each other may be achieved by the use of plural fastening members 84, after which said assembly is conveniently secured, as at 86, in a slightly spaced position from the rear panel 20 of the carrying case 12. The size of the rotating member 74 is slightly oversized relative to the track 76 so that a portion of the periphery of the member 74 is accessible to the exterior of the carrying case 12 through a slot 88 in the case side panel 20b. A series of spaced finger grip indentations 90 are provided about the peripheral edge of the member 74 to serve the obvious function of facilitating the turning of said member, and also to cooperate with a spring 92 fixedly mounted at one end in a shoulder of the panel member 78 and having its opposite end adapted to seat in each of the indentations 90 to establish a position of rotation of the rotating member 74. The details of the circuitry operatively associated with the switching mechanism 72 and best shown in FIG. 9 will subsequently be described. However, at this time it is to be noted that, in essence, the selective distribution of power is achieved by the functioning of radially extending electrical conductors 96 on the rear face of the member 74, and also strategically located circumferentially extending contacts, herein individually and collectively designated 98, which are provided on the front face of said member 74. The contact members 98 are essentially extensions of the conductors 96 and are arranged to cooperate with and make selective contact with other contacts 100 mounted on the front panel 80. Each of said contacts 100 has a spring-like body supported at one end, as at 102, on the front panel 80 and has a free end normally urged under the resiliency of the material of construction of said contacts through a slot 103 in this panel into surface contact with the front face of the rotating member 74. The radial positions of the contacts 100 are such that electrical contact is made between such contacts and the various contact segments 98 upon rotation of the rotating member 74. For example, the dot dash reference lines A, B, and C are intended to represent lines of contact which are established when the respective peripheral indentations 90a, 90b, and 90c are moved, in turn, through clockwise rotation into successive engagement with the spring 92. Thus, in the position of rotation of the rotating member 74 at which the peripheral indentation 90a is engaged by the spring 92, no contact is made by the contacts 100 which the contacts 98 along the reference line A. However, in the next position of rotation of the member 74, an electrical contact is made between one of the contacts 100 and the circumferentially extending contact specifically designated 98a in FIG. 6. In the next position of rotation, the previously established electrical contact with the contact segment 98a is maintained, and an additional contact is established with the contact member specifically designated 98b. Thus, depending on the position of rotation of the rotating member 74, different electrical connections are established through which the power being fed into the display device 10 through the conductor or power input 70 is distributed to different units of the lights 38. It should be noted that regardless of the position of rotation of the rotating member 74, that the spaced-apart spring contact 104 is always in contact with a centrally located contact 106 on said member to permanently establish at least one-half of the power distribution circuit.

Turning now more particularly to the circuit diagram of FIG. 9, the cross-sectioned structure thereof will be understood to be the rotating member 74, and the number 106 thereon designating the centrally located circular contact which is permanently electrically connected to the radially extending rear face conductors 96. Electrically connected to said conductors 96 by rivets through the rotating member 74, as at 108, are the circumferentially extending front face contacts 98. As clearly shown in FIG. 9, the contact spring 104 is at all times in contact against the central contact 106 and a varying number of light-energizing sub-circuits can be completed through the remaining contact springs 100 depending only upon the position of rotation of the member 74 and how many contact segments 98 are rotated into contact with the spring contacts 100. The circuitry of FIG. 9, generally designated 100, apart from the selective switching will be understood to be conventional and to include a transformer 112 having a primary winding 114 and a secondary winding 116. Electrical power is delivered to the primary winding 114 through the conductor 70 in electrical connection with an appropriate power source. In accordance with conventional circuit-designing practices, a main on-off switch 117 is advantageously provided in the transformer primary winding circuit. Parallel light-energizing sub-circuits are formed by electrical wiring or conductors, herein generally designated 118, separately provided for each of the pairs of lights 38 in the transformer secondary winding circuit. In addition to said lights 38, the thusly formed parallel sub-circuits of said secondary winding 116 also includes normally-open switches 120 and normally-closed switches 122, each totaling nine in number and associated with an individual one of the pairs of lights 38. The functioning of the circuitry 110 of FIG. 9 is best understood by tracing the sub-circuits associated with the lights 38 shown in FIG. 9 to be illuminated with those of the lights in other sub-circuits which obviously are not illuminated. That is, in the position of rotation which is illustrated in FIG. 9, and assuming that the main switch 117 is closed to complete the circuit for the primary winding 114 of the transformer 112, it follows that power is impressed across the secondary winding 116 and will effectively function to illuminate the lights 38 in any of the sub-circuits of said secondary winding which are completed by the establishment of an electrical connection between a spring contact 100 and a contact segment 98. As clearly illustrated in FIG. 9 and using the central contact 106 as a reference point, it will be noted that when proceeding from said central contact to the right that only the second, third and last encountered sub-circuits are completed by an established electrical connection at 98, 100. In the event that it is desired to illuminate a particular pair of lights 38 regardless of the rotational position of the member 74, this is done merely by actuating the appropriate normally-open switch 120 into its closed position. As best seen in FIG. 9, this has the obvious effect of directly completing the sub-circuit for each pair of lights. Further, in the event that the visual display presentation does not require the illumination of a particular set of lights, the user by opening a normally-closed switch 122 associated with said set of lights can avoid illumination despite the establishment of an electrical connection between the contact members 98, 100.

From the foregoing description, it should therefore be appreciated that the portable visual display device 10 represents a significantly useful instrument for salesmen or others requiring the effective use of visual aids during an oral demonstration.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A portable visual display device comprising a carrying case defining an interior enclosed area and having a main opening in one side thereof to said enclosed area, a display panel operatively mounted in said main opening and having indicia thereon which is rendered visible by illumination, a plurality of lights and means for mounting said lights within said enclosed area behind said display panel, a plurality of reflector means operatively disposed about said lights and extending therefrom to said display panel for confining the illumination of said lights to select areas on said display panel, a power source for illuminating said lights, and switching means located within said enclosed area and operatively connected between said power source and said lights for permitting the selective energizing of said lights for rendering visible said select areas on said display panel coextensive with said lights, said switching means including a member of a circular shape rotatably disposed within said enclosed area and free of attachment to any support means oriented along the axis of rotation of said member so as to be readily removable from said enclosure, said member having a peripheral portion accessible to the exterior of said carrying case and finger grip indentations along said peripheral portion for facilitating the turning of said member through positions of rotation, a support surface in supporting abutment with one side of said member, a spring means located on the side of said member remote from said support surface adapted to extend into said indentations for establishing each position of rotation of said member and to maintain said member against said support surface, and contact means carried by said member for establishing an electrical connection between said power source and select lights in each position of rotation of said member.

2. A portable visual display device as defined in claim 1 including conductor means for establishing an electrical connection connected between said power source and said lights so as to by-pass said contact means of said rotating member and normally-open additional contact means operatively connected in said conductor means and effective when closed to selectively energize said lights for operating said lights independently of said rotating member.

3. A portable visual display device as defined in claim 2 including normally-closed additional contact means operatively associated with said rotating member and effective when actuated open to selectively prevent the operating of said lights by said rotating member.

References Cited

UNITED STATES PATENTS

| | | | |
|---|---|---|---|
| 2,646,636 | 7/1953 | Gandee | 40—106.1 X |
| 2,821,037 | 1/1958 | Westphal | 40—106.1 X |
| 3,030,848 | 4/1962 | Wick. | |
| 3,089,923 | 5/1963 | Wright. | |

FOREIGN PATENTS

| | | |
|---|---|---|
| 693,371 | 9/1964 | Canada. |
| 1,142,655 | 4/1957 | France. |

LAWRENCE CHARLES, *Primary Examiner.*